April 17, 1928.
G. E. FARLEY
1,666,283
COMBINED TIRE INFLATING VALVE AND GAUGE
Filed June 23, 1925
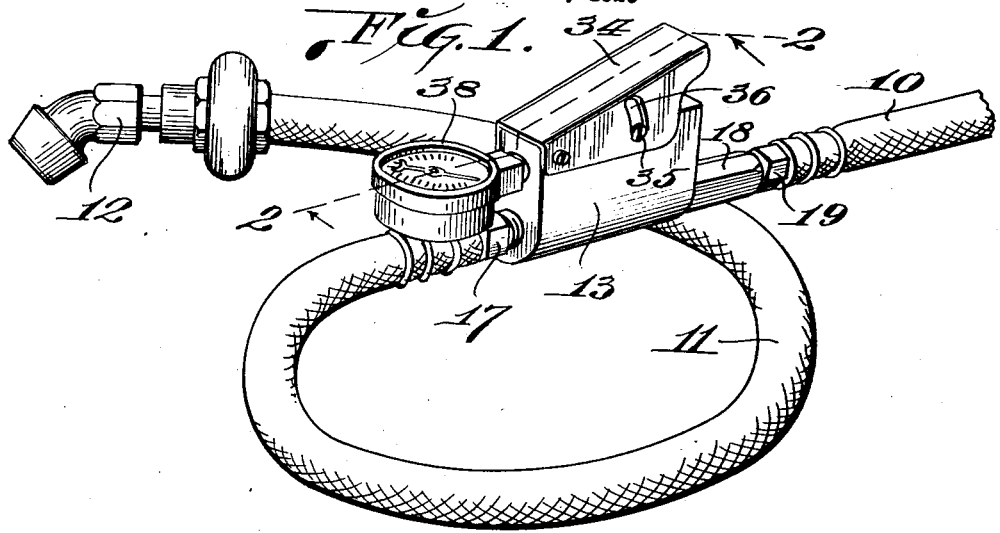
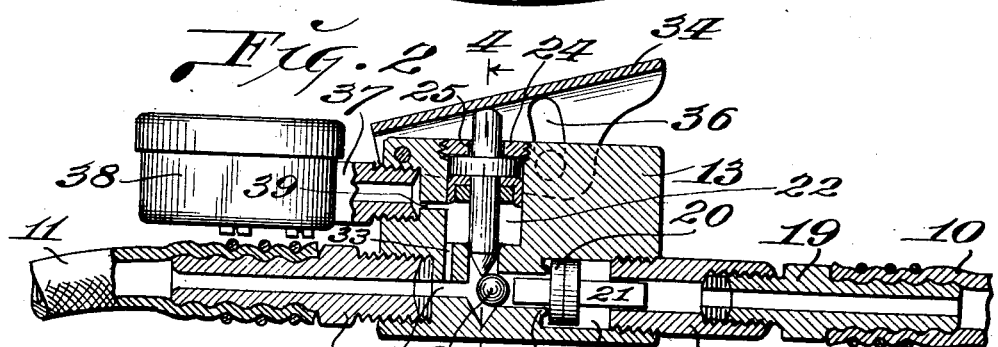
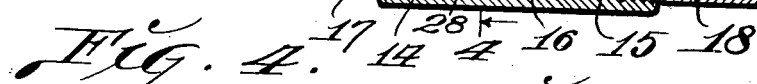
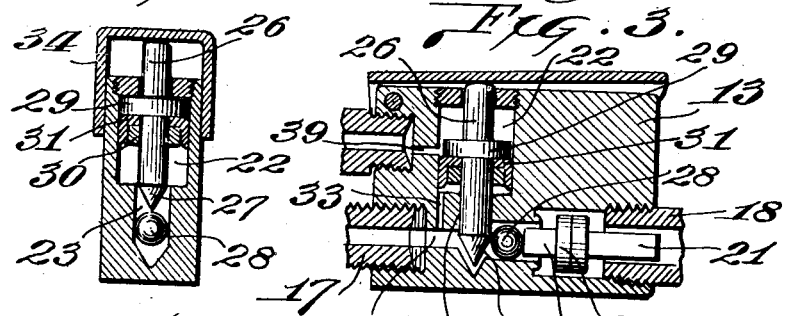
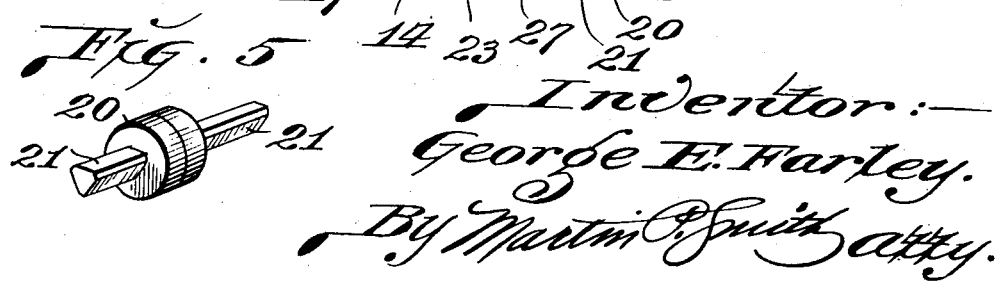
Inventor:—
George E. Farley.
By Martin P. Smith atty.

Patented Apr. 17, 1928.

1,666,283

UNITED STATES PATENT OFFICE.

GEORGE E. FARLEY, OF SOUTHGATE, CALIFORNIA, ASSIGNOR TO SERVICE EQUIPMENT CO., OF SOUTHGATE, CALIFORNIA, A CORPORATION OF CALIFORNIA.

COMBINED TIRE-INFLATING VALVE AND GAUGE.

Application filed June 23, 1925. Serial No. 39,014.

My invention relates to a combined pneumatic tire inflating valve and pressure gauge and has for its principal objects the provision of a relatively simple, practical and efficient valve that is adapted to be located in the flexible air line that conducts compressed air from a pump or tank to the filling valve that is directly applied to the tire valve stem.

Further objects of my invention are to generally improve upon and simplify the construction of the existing forms of combined tire filling valves and gauges, to provide a combined tire inflating valve and gauge that may be readily manipulated so as to indicate on the associated gauge the air pressure within the tire that is being inflated, to provide a device of the character described that is devoid of all springs and which latter, it will be understood, are more or less inefficient in service due to their tendency to become inoperative after a short period of service, and further to provide a combined tire inflating valve and gauge that may be easily and cheaply produced and which embodies a relatively small number of operating parts and which latter are arranged and protected so as to minimize the possibility of their becoming inoperative under ordinary usage.

With the foregoing and other objects in view, my invention consists in certain novel features of construction and arrangement of parts that will be hereinafter more fully described and claimed and illustrated in the accompanying drawing in which Fig. 1 is a perspective view of a portion of flexible air line that is used for tire filling purposes and showing a combined valve and gauge of my improved construction applied thereto.

Fig. 2 is an enlarged vertical section taken approximately on line 2—2 of Fig. 1.

Fig. 3 is a section similar to Fig. 2 and showing the hand lever depressed so as to unseat the valve that controls the flow of compressed air through the device.

Fig. 4 is a cross section taken on the line 4—4 of Fig. 2.

Fig. 5 is a perspective view of the valve that controls the flow of air pressure through the device.

Referring by numerals to the accompanying drawing which illustrates a practical embodiment of my invention, 10 designates the hose or flexible air line that leads from a pump or compressed air tank, 11 a short flexible tube that carries at its outer end a filling valve 12 that is adapted to be applied directly to the valve stem of a pneumatic tire. My improved inflating valve and gauge is arranged so that it forms a direct connection between flexible members 10 and 11, and said inflating valve comprises a substantially rectangular body 13, preferably formed of metal, through the lower portion of which is formed a duct 14, one end of which is enlarged to form a valve chamber 15, and formed between this chamber and the smaller portion of duct 14 is an annular valve seat 16.

A suitable nipple 17 is screwed into the body 13 so as to connect duct 14 with flexible member 11, and screwed into the opposite end of body 13 is a nipple 18 that receives a second nipple 19 and which latter is carried by the end of flexible member 10. The inner end of nipple 18 communicates directly with valve chamber 15, and arranged to move freely in chamber 15 is a disk valve 20, preferably of hard rubber, fiber, or analogous material, that is adapted to engage valve seat 16.

Valve 20 is provided with axially arranged stem portions 21 that are non-circular in cross section and which are adapted to move freely through the inner end of nipple 18 and through that portion of duct 14 that is immediately adjacent to valve seat 16.

Formed in the upper central portion of the body 13 is a substantially cylindrical valve chamber 22, and extending from the lower portion thereof downwardly through the lower portion of body 13 is a short duct 23 that is co-axial with chamber 22 and which intersects duct 14.

Screw-seated in the upper portion of chamber 22 is a disk 24 provided with a centrally arranged aperture 25, and arranged to slide freely through this aperture 25 and the duct 23 is a valve stem 26 that is provided with a conical lower end 27. This conical lower end of stem 26 is adapted to traverse duct 23, and loosely arranged in that portion of the duct 14 that is immediately adjacent to duct 23 is a ball 28.

The parts just described are arranged so that when stem 26 is moved downward, the conical lower end 27 thereof, will bear on ball 28 to move the same a short distance through duct 14 and bear against the corresponding end of stem 21 so as to move valve 20 away from its seat 16.

Carried by stem 26 and arranged within chamber 22 is a valve comprising an upper disk 29, a lower disk and a cup washer 31 of leather or analogous material, the downturned edge of which overlies the periphery of the lower disk 30.

Stem 26 with its discs 29 and 30 and cup washer 31, functions as a floating valve in its chamber 22 and it serves the dual purpose of preventing the escape of fluid pressure and of controlling the admission of tank pressure through the device into the tire.

Leading from the lower end of chamber 22 downward through body 13 to duct 14 is a small fluid pressure duct. Pivotally secured to the upper front corner of the valve body 13 is the forward end of a hand lever 34 that is of inverted U-shape in cross section in order that it may fit snugly over the upper portion of said body 13 and the under surface of this lever bears directly on the upper end of stem 26.

Vertical movement of hand lever 34 is regulated by means of a pin or screw 35 that is seated in the upper portion of valve body 13, and which passes through an arcuate slot 36 that is formed in the side wall of handle 34.

Screw-seated in the upper front end of body 13 and directly above nipple 17 is the tubular stem 37 of an ordinary air pressure gauge 38, and leading from chamber 22, to the inner end of said stem 37 is a small fluid pressure duct 39.

When my improved inflating valve and gauge is in service, valve 20 is held against its seat 16 by the air pressure in tube 10 and which latter is directly connected to a compressed air tank. In adding compressed air to a tire so as to inflate same to a desired pressure, it is usually the practice to ascertain the pressure within the tire before admitting compressed air from the storage tank thereto and, in order to thus ascertain the tire pressure, member 12 is applied to the valve stem of the tire and manipulated so as to unseat the stem of said valve, and as a result air pressure from the tire will pass outwardly through member 12, tube 11, duct 14, duct 33, and if the valve carried by stem 26 is positioned in the lower portion of chamber 22, this air pressure will act upon the cup washer 31 to move stem 26 and its valve upwardly thereby opening the inner end of duct 39 and the air pressure will thereby enter gauge 38 so that the latter will accurately register the tire pressure.

Inasmuch as the pressure in the storage tank to which tube 10 is connected is always greater than ordinary tire pressures, the back pressure from the tire through the inflating valve will not unseat valve 20. To permit pressure from the supply tank and tube 10 to enter the tire, the operator depresses the rear end of hand lever 34, thereby moving stem 26 downward and as a result the cup washer 31 passes over and closes duct 39, and as the stem continues to move downward said cup washer will pass the inner end of duct 39 thereby permitting the pressure that was within gauge 38 to escape through the upper portion of chamber 22 and through the clearance between the upper portion of stem 26 and disk 24. Thus the pointer of gauge 36 will return to zero.

After moving a predetermined distance downwardly the conical lower end 27 of stem 26 will engage ball 28, to move the same in an outward direction through duct 14 and said ball will in turn engage against the corresponding end of stem 21 and move said stem outwardly thereby unseating valve 20. Thus at the end of the downward movement of stem 26, valve 20 will be unseated as illustrated in Fig. 3 and the cup washer packing 31 will be acted upon by the tank pressure to pack the point between the floating valve and wall of chamber 22, thereby effectually cutting off the passage of fluid pressure upwardly through chamber 22 and through duct 39 into the gauge.

The relatively high pressure from the storage tank is now free to pass through tube 10, nipples 18 and 19, chamber 15, duct 14, and thence through tube 11 and valve 12 and through the filling stem of the tire.

Thus the gauge 38 will not register while the tire is being thus inflated and as long as the hand lever 34 is held downward so as to unseat valve 20.

In order to test the pressure within the tire and obtain a reading of the pressure on gauge 38, it is only necessary to release the pressure of the hand on lever 34 and the pressure against the underside of cup washer 31 will move stem 26 and parts carried thereby upwardly and as such action takes place valve 20 will return to its seat and immediately thereafter cup washer 31 will pass above duct 39 whereupon the passageway is open for the air pressure from the inflated tire to enter gauge 38 and actuate the hand or pointer thereof and consequently give an accurate reading of the tire pressure.

The floating valve that operates in chamber 22 is free to move in both directions and in addition to serving as a plunger to unseat the main fluid pressure valve 20 it controls the passage of fluid pressure to the gauge. Inasmuch as the flange of the cup leather 31 extends down over the edge of disc 30, said cup leather automatically functions as a perfect packing whenever it is subject to fluid pressure from beneath.

A particularly desirable feature of my invention as herein described resides in the absence of springs in the valve and which springs, it will be understood, are prone to become easily broken or inoperative, particularly in devices that are subjected to a certain degree of rough usage, and further the use of a ball between the tapered lower end of the stem or plunger 26 and the main pressure valve 20 enables the parts to move readily and positively when the hand lever is depressed.

Thus it will be seen that I have produced a combined tire inflating valve and gauge that is compact in structure, capable of being easily and cheaply produced and which possesses superior advantages in point of simplicity, durability and general efficiency.

It will be understood that minor changes in the size, form and construction of the various parts of my improved combined tire inflating valve and gauge may be made and substituted for those herein shown and described without departing from the spirit of my invention, the scope of which is set forth in the appended claims.

I claim as my invention:

1. In a combined tire inflating valve and gauge, a valve body having a main air pressure duct, a valve adapted to normally rest on a seat within said duct and to be retained in such position by air pressure, a branch duct leading from said main duct, a manually operable valve arranged for operation within the branch duct and adapted when manipulated to cut off the passage of air pressure, a cup leather packing on the underside of said valve and means within the main duct and adapted to be actuated by said manually operable valve for unseating the valve in the main duct when said manually operable valve is actuated.

2. In a combined tire inflating valve and gauge, a valve body having a main air pressure duct, a valve for normally closing the air pressure duct through said member which valve is adapted to be maintained in closed position by air pressure, a plunger arranged for operation within said member and disposed substantially at right angles to the duct therethrough, said plunger being provided with a tapered inner end and a ball arranged for movement in the main air pressure duct through said member and disposed between the tapered end of the plunger and the valve that normally closes said air pressure duct.

3. In a combined tire inflating valve and gauge, a valve body having a main air pressure duct, a valve for normally closing the air pressure duct through said member which valve is adapted to be maintained in closed position by air pressure, a plunger arranged for operation within said member and disposed substantially at right angles to the duct therethrough, said plunger being provided with a tapered inner end, a ball arranged for movement in the main air pressure duct through said member and disposed between the tapered end of the plunger and the valve that normally closes said air pressure duct and a hand lever pivotally mounted on the member for moving said plunger into said member.

4. In a device of the class described, a member having a main fluid pressure duct in which is formed a valve seat, a valve normally bearing upon said seat and adapted to be maintained thereon by air pressure, a branch duct leading from said main duct, which branch duct is provided with an outlet, a manually operable plunger arranged for movement within said branch duct, a valve carried by said plunger for cutting off communication from the branch duct through the outlet therefrom and for cutting off communication between the main duct and branch duct and a cup leather packing on the underside of said valve.

5. In a device of the class described, a valve body having a main fluid pressure duct in which is formed a valve seat, a valve normally bearing upon said seat and adapted to be maintained thereon by air pressure, a branch duct leading from said main duct, said branch duct having an outlet, a manually operable plunger arranged for movement within said branch duct, a valve carried by said plunger for closing the outlet from said branch duct and for cutting off communication between the main duct and branch duct, a cup leather packing on the underside of said valve, and a member arranged in the main duct between the inner end of said plunger and the valve in said main duct for unseating the latter when said plunger is moved into said member.

6. In a device of the class described, a valve body provided with a main fluid pressure duct in which is formed a valve seat, a valve normally resting on said seat and adapted to be maintained in such position by fluid pressure, said valve being provided with a stem, a manually operable plunger arranged for operation within said member, the inner end of which plunger projects into said main duct and a ball arranged for movement within said main duct between the inner end of said plunger and the adjacent end of the valve stem.

7. In a device of the class described, a valve body provided with a main fluid pressure duct in which is formed a valve seat, a valve normally resting on said seat and adapted to be maintained in such position by fluid pressure, said valve being provided with a stem, a manually operable plunger arranged for operation within said member, the inner end of which plunger projects into said main duct, a member arranged for movement within said main duct between the inner end of said plunger and the adjacent end of the valve stem and there being an outlet that leads from the main fluid pressure duct in front of the valve therein.

8. In a device of the class described, a valve body having a fluid pressure duct, a valve for normally closing said duct and to be maintained in closed position by fluid pressure, a stem projecting from said valve, a spherical member loosely mounted in the duct and adapted to bear against the end of the said stem and a manually operable plunger arranged for operation in said member and disposed at right angles to the axis of said valve and its stem and having an inclined face formed on its inner end for engagement with said spherical member when said plunger is forced inwardly into said member.

9. In a device of the class described, a valve body having a fluid pressure duct, a valve for normally closing said duct and to be maintained in closed position by fluid pressure, a stem projecting from said valve, a spherical member loosely mounted in the duct and adapted to bear against the end of the said stem, a manually operable plunger arranged for operation in said member and disposed at right angles to the axis of said valve and its stem and having an inclined face formed on its inner end for engagement with said spherical member when said plunger is forced inwardly into said member and there being an outlet duct in said valve body in front of the valve therein.

10. In a combined tire inflating valve and gauge, a valve body having a main air pressure duct, a valve for normally resting on a seat within said duct, and to be retained in such position by fluid pressure, a branch duct leading from said main duct, said branch duct having an outlet, a floating valve arranged within the duct for controlling the fluid pressure from the main duct through the branch duct, said valve being moved in one direction by fluid pressure, a cup leather packing on the underside of said valve and manually operable means for moving the valve in the opposite direction against the fluid pressure.

11. In a combined tire inflating valve and gauge a valve body having a main air pressure duct, a valve for normally resting on a seat within said duct, and to be retained in such position by fluid pressure, a branch duct leading from said main duct, said branch duct having an outlet, a floating valve arranged within the branch duct, said valve being moved in one direction by fluid pressure, a cup leather packing on the underside of said valve, manually operable means for moving the valve in the opposite direction against the fluid pressure and means adapted to be actuated by said floating valve when the same is moved downwardly for unseating the valve in the main duct.

In testimony whereof I affix my signature.

GEORGE E. FARLEY.